(12) United States Patent
Zinner et al.

(10) Patent No.: US 11,764,997 B2
(45) Date of Patent: Sep. 19, 2023

(54) APPARATUS FOR CONFIGURING AND VALIDATING AN INTERVENTION IN A REAL-TIME ETHERNET DATA NETWORK

(71) Applicant: Continental Automotive GmbH, Hannover (DE)

(72) Inventors: Helge Zinner, Regensburg (DE); Daniel Hopf, Regensburg (DE)

(73) Assignee: Continental Automotive GmbH, Hannover (DE)

( * ) Notice: Subject to any disclaimer, the term of this patent is extended or adjusted under 35 U.S.C. 154(b) by 311 days.

(21) Appl. No.: 17/287,883

(22) PCT Filed: Oct. 31, 2019

(86) PCT No.: PCT/EP2019/079862
§ 371 (c)(1),
(2) Date: Apr. 22, 2021

(87) PCT Pub. No.: WO2020/089409
PCT Pub. Date: May 7, 2020

(65) Prior Publication Data
US 2021/0392013 A1   Dec. 16, 2021

(30) Foreign Application Priority Data
Nov. 1, 2018   (DE) ............. 10 2018 218 736.3

(51) Int. Cl.
| H04L 12/40 | (2006.01) |
| H04L 1/18 | (2023.01) |
| H04L 67/12 | (2022.01) |
| B60R 16/023 | (2006.01) |
| H04L 1/1809 | (2023.01) |

(52) U.S. Cl.
CPC ...... *H04L 12/40143* (2013.01); *B60R 16/023* (2013.01); *H04L 1/1809* (2013.01); *H04L 12/40169* (2013.01); *H04L 67/12* (2013.01); *H04L 2012/40273* (2013.01)

(58) Field of Classification Search
CPC ............. H04L 12/40143; H04L 1/1809; H04L 12/4019; H04L 67/12; B60R 16/023
See application file for complete search history.

(56) References Cited

U.S. PATENT DOCUMENTS

| 2004/0039500 | A1 | 2/2004 | Amendola et al. |
| 2007/0076593 | A1 | 4/2007 | Sakurai |
| 2008/0216067 | A1 | 9/2008 | Villing |

(Continued)

FOREIGN PATENT DOCUMENTS

| DE | 10037397 A1 | 2/2002 |
| DE | 102007040094 A1 | 2/2009 |

(Continued)

OTHER PUBLICATIONS

International Search Report and Written Opinion dated Feb. 20, 2020, from corresponding International Patent Application No. PCT/EP2019/079862.

(Continued)

*Primary Examiner* — Ronald B Abelson

(57) ABSTRACT

An apparatus for configuring and validating an intervention in a real-time Ethernet data network for a motor vehicle includes: a vehicle diagnostic device, a first data storage device, a first data checking device, a second data storage device, and a second data checking device.

7 Claims, 4 Drawing Sheets

(56) References Cited

U.S. PATENT DOCUMENTS

2017/0192770 A1 7/2017 Ujiie et al.
2017/0212746 A1 7/2017 Quin et al.
2019/0146775 A1 5/2019 Wang et al.

FOREIGN PATENT DOCUMENTS

DE 102014219322 A1 3/2016
DE 102017218872 A1 4/2019
DE 102017220472 A1 5/2019
EP 3382976 A1 10/2018

OTHER PUBLICATIONS

Decision to Grant dated Oct. 12, 2022 from corresponding European patent application No. 19798236.6.
Office Action dated Oct. 26, 2022 from corresponding German patent application No. 10 2018 218 736.3.

APPARATUS FOR CONFIGURING AND VALIDATING AN INTERVENTION IN A REAL-TIME ETHERNET DATA NETWORK

BACKGROUND

The present invention concerns a system for real-time Ethernet data networks.

In particular, the present invention concerns an apparatus for configuring and validating an intervention in a real-time Ethernet data network for a motor vehicle.

As interest increases, the new Ethernet TSN (Time Sensitive Network) standard is being assigned the field of application of automated driving. In contrast to standard Ethernet and Ethernet AVB, Ethernet TSN can guarantee packet transfer guarantees (for a maximum transfer time) in the range of a few microseconds.

In addition, the standard provides a lot of support in the area of safety and security, for example by detecting and eliminating erroneous data streams.

So-called "Babbling Idiots" can also be recognized and eliminated. This allows fail-safe functionality to be provided for the remainder of the vehicle network.

TSN Ethernet as a new networking technology is increasingly being used in automobiles. To allow automated driving with fast bus systems (such as Ethernet) to be supported, solutions need to be offered that can also be made congruous in the long term using a backend. Even if initially it were just in the event of an error, in order to eliminate such an error subsequently.

In regard to assistance functions in the future, some of which are supposed to take over control of the motor vehicle completely (perhaps even from the backend), mechanisms that permit reconfiguration of the vehicle electrical system (and adaptation for new driving functions) will increasingly be necessary.

In regard to surroundings recognition, the wealth of different driving situations cannot be measured fully today. Besides the static traffic regulations, there are far more complex situations with pedestrians, objects, animals and other vehicles in traffic.

Although software updates are already possible today, they require the necessary memory (e.g. resources in the Ethernet switch) to be kept available for functions that are actually still unknown.

This can be achieved only with difficulty in view of the costs in cars.

Moreover, the (static) vehicle electrical system architecture and the performance of the control units limit the functional diversity of new options. The vehicle electrical system and the control units today are designed precisely for functions that are assigned to the vehicle when it leaves the production plant and none that are added later. By way of example, even today a car can already have firmly scheduled applications kept available for the memories when it is delivered, which are not loaded until subsequently.

Before an Ethernet TSN network (use visible in the area of automated driving) can be used, for example reservation requests from senders to any receivers need to be used to reserve a certain quality of service (latency and bandwidth). However, this requires a multiplicity of parameters to be configured in the overall network.

Ethernet TSN alone comprises more than ten individual substandards that define a multiplicity of state machines and parameters.

For example, the time synchronization standard IEEE802.1AS-Rev alone includes the following parameters:
selection of the best clock
frequency of the line delay measurement
upper limit of the line delays in nanoseconds
frequency of the exchange of time information
frequency of the exchange of announce information
clock quality 1
clock quality 2
clock type
and many more.

BRIEF SUMMARY

It is an object of the present invention to provide an improved apparatus for configuring and validating an intervention in a real-time Ethernet data network for a motor vehicle.

This object is achieved by the subjects of the independent patent claims. Developments and embodiments can be found in the dependent patent claims, the description and the figures of the drawings.

A first aspect of the present invention concerns an apparatus for configuring and validating an intervention in a real-time Ethernet data network for a motor vehicle.

The apparatus for configuring and validating an intervention in a real-time Ethernet data network comprises a vehicle diagnostic device, a first data storage device, a first data checking device, a second data storage device and a second data checking device.

The vehicle diagnostic device is configured to receive configuration change data and to transfer said configuration change data to a first data storage device.

The first data storage device is configured to receive the configuration change data from the vehicle diagnostic device and store it.

The first data checking device is configured to check the configuration change data stored in the first data storage device by using a first integrity check and to transfer said configuration change data to the second data storage device in the event of a positive first integrity check.

The second data storage device is configured to receive the configuration change data from the first data checking device and store it.

The second data checking device is configured to check the configuration change data stored in the second data storage device by using a second integrity check and to enable said configuration change data for the real-time Ethernet data network in the event of a positive second integrity check. The integrity check can also include a check on the feasibility or the implementation, or ascertainment of the effects on other control units or ECUs.

In other words, the integrity check includes a check for suitability and/or feasibility of the configuration, and the cross-dependencies are also weighed up.

The second data checking device has, for example, the tables that store which data streams with which parameters are present in the network, which ones are to be reconfigured, which ones are to be removed and which ones are added.

The second data checking device or the E/E architecture module can check whether the reconfiguration in the network leads to unrealizable conflicts and, in such a case, prevents a reconfiguration.

The present invention allows a technical system in a vehicle, which permits some or all of an Ethernet TSN configuration in the control units and switches to be renewed. The present invention provides an opportunity for the ECUs—electronic control unit denotes control units or microcontrollers—to also be reconfigured from the cloud.

The present invention comprises a system design and multiple processes in order to additionally allow a time-controlled update of the Ethernet switches—also referred to as a multiport bridge or "network switch". Various service-oriented variants are used for communication.

The present invention advantageously allows use in the area of automated driving, since here a multiplicity of control units interact and a configuration change can be made during operation. For example by updating sensors, for example with new traffic regulations, for example by means of AI algorithms and swarm intelligence.

Since a system manufacturer usually only produces individual control units, he must also safeguard his control unit such that any malfunctions can be compensated for by other control units.

The proposed solution allows Ethernet also to be used in vehicle systems in which there are high demands on functional safety. Moreover, the present invention provides the opportunity to provide software updates for new driving functions and also to assign these functions a defined quality of service in the vehicle communication network.

This can increase the reliability of the vehicle network. Control units and the microcontrollers operating in them can be separated from the communication in the event of an error in order to keep down the damage or a negative effect on other control units and other communication data. The present invention can minimize the probability of failure of networks and any damage.

This provides an additional monitoring function that is helpful during operation and that could be useful for functional safety, especially in the area of automated driving.

In the current IEEE Ethernet standards, there is no method that addresses or even solves the problem described above.

There is no method that can ensure that an Ethernet TSN configuration in the motor vehicle is correctly configured and can be renewed without interference.

In other words, the basic idea here is not just flashing and configuring, but rather the E/E architecture module—which also checks the configuration with regard to other ECUs or data streams.

The present invention makes it possible to configure or allocate network resources from the backend or to plan the distribution thereof, to eliminate system errors, to install and/or update new algorithms/functions for automated driving, to achieve a validation of the assured resources and to configure Ethernet switches with TSN.

Advantageous refinements of the present invention can be found in the sub claims.

In one advantageous embodiment of the present invention, the apparatus further comprises a configuration master device, which is configured to receive the configuration change data from the second data storage device and to transmit said configuration change data to a switch and/or a component of the real-time Ethernet data network.

In one advantageous embodiment of the present invention, the first data checking device is configured to check the configuration change data stored in the first data storage device for a communication parameter, for example in the form of a maximum packet size and/or a transfer frequency and/or a transfer rate and/or a sender address and/or a receiving address and/or a protocol, by using the first integrity check.

In one advantageous embodiment of the present invention, the second data checking device is configured to check the configuration change data stored in the second data storage device by using the second integrity check in the form of a hash function check and/or a cyclic redundancy check and/or a suitability check and/or a feasibility check on the configuration.

During the second integrity check, for example it can also be checked whether and what effects the configuration has on the vehicle electrical system. This includes a check on the ECUs for the flashed and/or configured configuration, and a check on the associated communication relationship and any cross-connections. If for example a new data stream is configured and requires a higher data rate, then this module checks whether sufficient data rate is still available.

Furthermore, the priority of data streams can be changed during a reconfiguration, for example—the module checks whether the quality of service requirements of the other data streams are still met as a result.

In one advantageous embodiment of the present invention, the apparatus further comprises an ARQ/TCP device, which is configured to monitor the transfer of the configuration change data to the switch and/or the component of the real-time Ethernet data network and the configuration process based thereon, and to report back the success of the configuration.

In one advantageous embodiment of the present invention, the apparatus is configured to monitor an individual configuration process for a switch and/or a component of the real-time Ethernet data network.

In one advantageous embodiment of the present invention, the apparatus is configured to monitor a multiplicity of configuration processes for a multiplicity of network switches and/or for a multiplicity of components of the real-time Ethernet data network.

In one advantageous embodiment of the present invention, the apparatus is configured to prioritize the multiplicity of configuration processes for the multiplicity of network switches and/or for the multiplicity of components of the real-time Ethernet data network in terms of timing and/or to perform at least some of said multiplicity of configuration processes simultaneously or for example to activate at least some of said multiplicity of configuration processes simultaneously following successful configuration.

In one advantageous embodiment of the present invention, the apparatus is configured to activate at least some of the multiplicity of configuration processes for the multiplicity of network switches and/or for the multiplicity of components of the real-time Ethernet data network simultaneously on the network switches and/or the components.

The described refinements and developments can be combined with one another as desired.

Further possible refinements, developments and implementations of the present invention also comprise combinations, which have not been explicitly specified, of features of the present invention that are described above or below with respect to the embodiments.

The accompanying drawings are intended to convey further understanding of the embodiments of the present invention.

The accompanying drawings illustrate embodiments and serve, in conjunction with the description, to clarify concepts of the present invention.

Other embodiments and many of the specified advantages become apparent in relation to the figures of the drawings. The illustrated elements of the figures of the drawings are not necessarily shown true to scale with respect to one another.

BRIEF DESCRIPTION OF THE DRAWINGS

In the figures.

In the figures of the drawings, identical reference signs denote identical or functionally identical elements, assemblies, components or method steps, unless specified otherwise.

DETAILED DESCRIPTION

Figure 1:
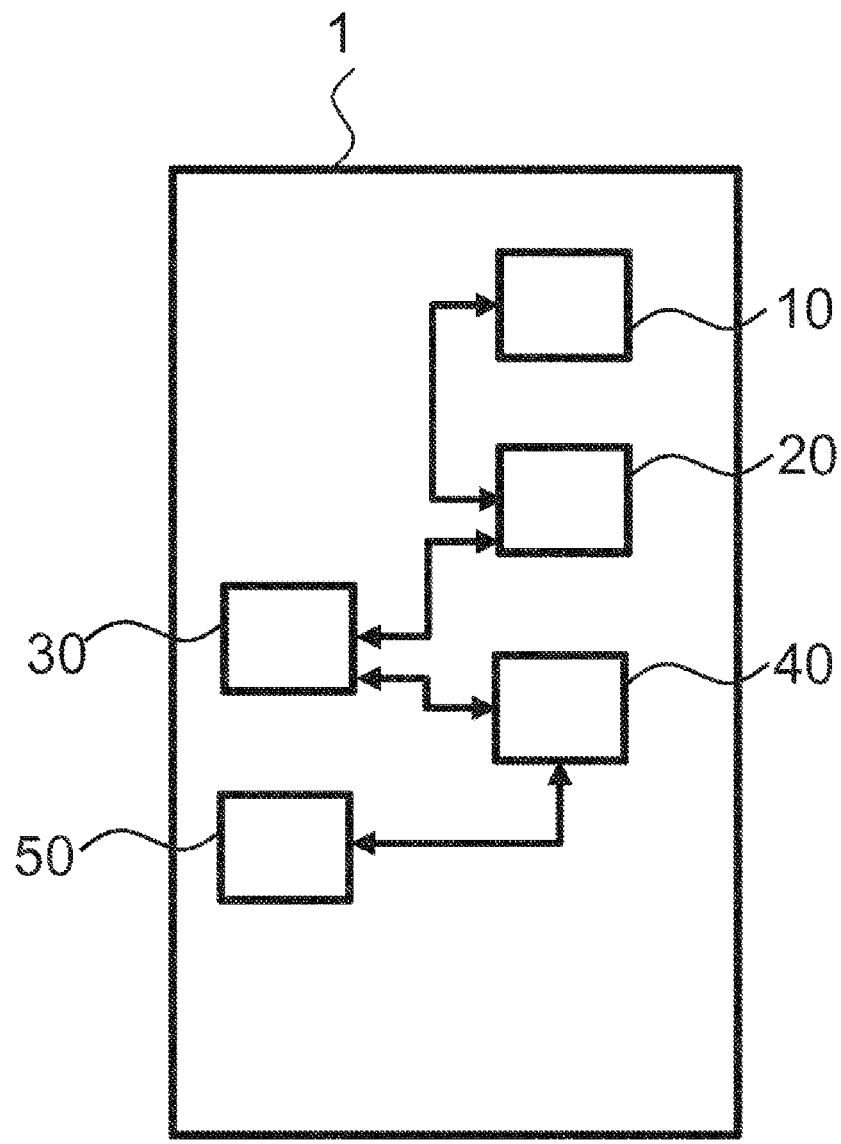
FIG. 1 shows a schematic depiction of an apparatus according to an exemplary embodiment of the present invention.

FIG. 1 shows a schematic depiction of an apparatus according to an exemplary embodiment of the present invention.

The apparatus 1 for configuring and validating an intervention in a real-time Ethernet data network for a motor vehicle comprises a vehicle diagnostic device 10, a first data storage device 20, a first data checking device 30, a second data storage device 40 and a second data checking device 50.

Figure 2:
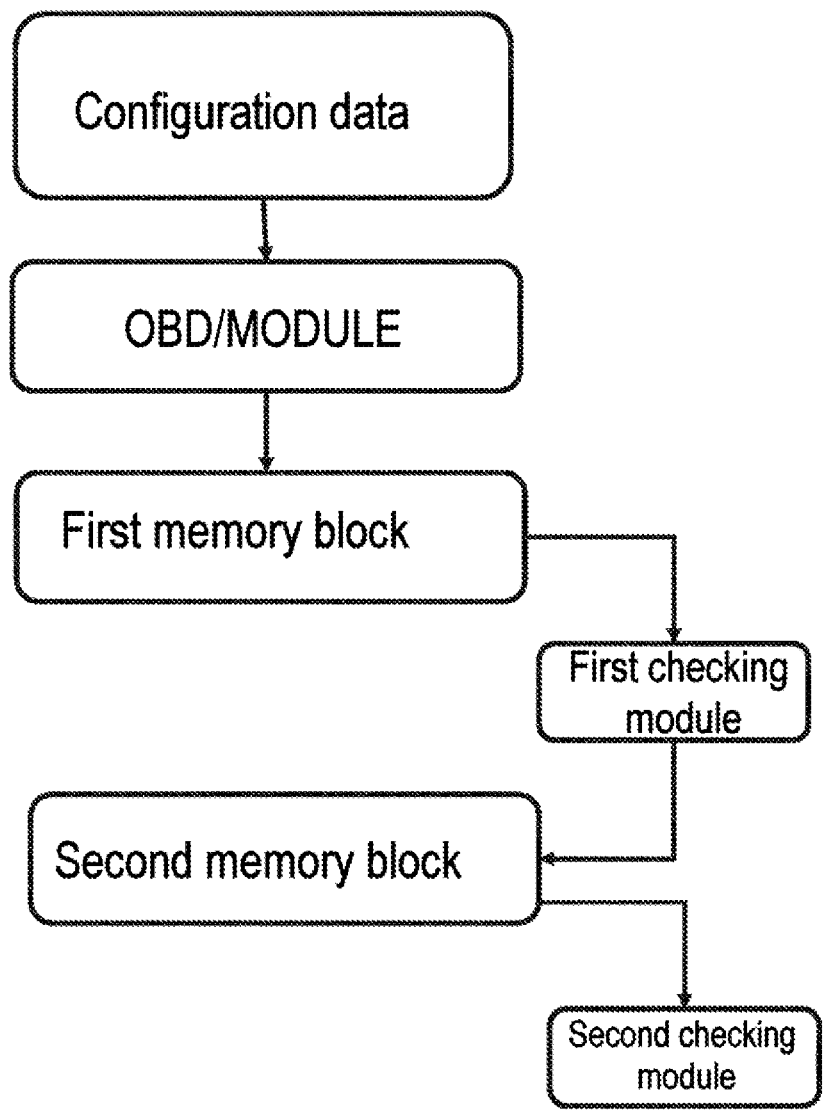
FIG. 2 shows a schematic depiction of an apparatus according to an exemplary embodiment of the present invention.

FIG. 2 shows a schematic depiction of an apparatus according to an exemplary embodiment of the present invention.

FIG. 2 depicts the system architecture proposed by the present invention for configuring and monitoring a TSN network or a real-time Ethernet network or an Ethernet network.

The present invention makes it possible, when a new configuration is imported (e.g. setting the maximum bandwidth and packet size for a switch, changing quality of service parameters, configurations of a new VLAN, changing the data stream receiver, changing the data stream frequency, activating security protocols), for the actual flashing not to be hindered or blocked because filters are therefore still being set during the process.

The configuration is communicated to the gateway by an OBD interface or by a radio interface, for example. First and foremost, the communication, regardless of the content, is checked in real time.

The first data checking device in the form of a security module checks for example the maximum packet size and the frequency of the communication packets.

Should no error occur in this instance, the data are stored in a first memory block. These are still nonsecure data, which is why this can be carried out in a physically separate memory block.

This is to prevent the secure memory block from being accessed in the event of erroneous or malicious data.

Furthermore, there can be provision for a so-called "deep packet inspection" to be carried out on the downloaded content. Deep packet inspection (DPI; also complete packet inspection or Information eXtraction, IX) is a process in network technology for monitoring and filtering data packets. It involves the data portion and the header portion of the data packet being simultaneously examined for specific features such as protocol infringements, computer viruses, spam and other undesirable content.

In addition to checking the hash code or CRC, etc., this is also supposed to examine the content for any malware.

If the check (on the existing regulations) is successful, the content is transferred to the secure memory block. The configuration data change is located here in the demilitarized zone of the motor vehicle.

The stored configuration that is supposed to be applied to the network is checked for validity and feasibility in a special module.

The second data checking device in the form of an E/E architecture module checks for example whether the downloaded configuration is actually executable safely when executed in the network and does not cause damage, for example, or whether existing communication connections are disrupted.

The second data checking device checks, among other things, how many functions are affected by the software update, that is to say how many ECUs/switches and which communication relationships.

By way of example, the addresses, the memory requirement, the communication relationships and the vehicle electrical system load are checked here. By way of example, a reconfiguration to be carried out in accordance with the downloaded configuration data could bring the entire network to a standstill, for example if communication ports are deactivated.

This is prevented by the check by the E/E module. Furthermore, this module sets the required filter settings in the applicable switches/ECUs so that the traffic can pass in the first place.

Furthermore, the present invention proposes a configuration master module that has access to the secured memory.

Said configuration master module loads the checked configuration data and transmits the data to a connected switch or ECU on the basis of the state of the motor vehicle.

It can happen that for example an update can be flashed during operation and that an update can be carried out only when the vehicle—at least the vehicle data network—is not working. Additionally, the ARQ/TCP module monitors the configuration process and monitors the state machines for successful loading of the configuration.

Figure 3:
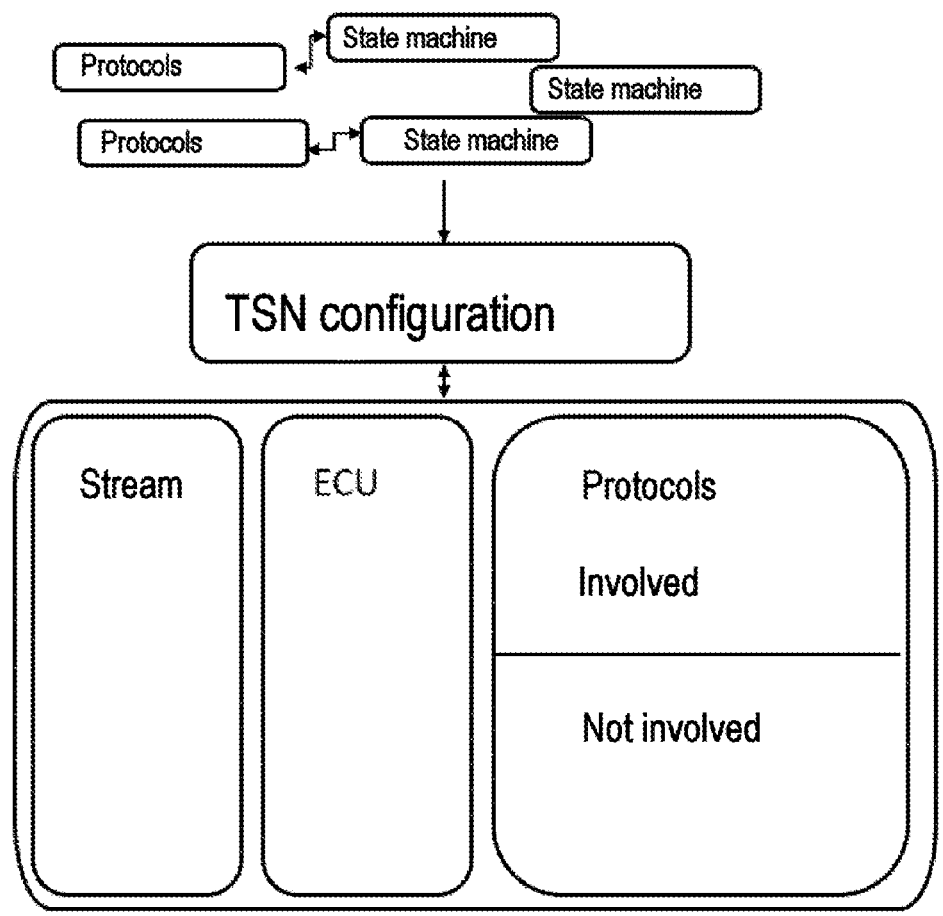
FIG. 3 shows a schematic depiction of an architecture module of an apparatus according to an exemplary embodiment of the present invention.

FIG. 3 shows a schematic depiction of an apparatus according to an exemplary embodiment of the present invention.

FIG. 3 shows the architecture model shown in FIG. 2 in detail. This module has the task of monitoring the TSN network and the multiplicity of data streams communicated therein.

Specifically, the software module or architecture model implements new methods in order to monitor the parameters and state machines of the TSN protocols.

By way of example, the module that has and/or is connected to the best clock in the system always determines the message rate of said clock.

With knowledge of all data streams, the module can reconfigure the network and the deterministic behavior thereof with regard to new driving functions.

With the information about the resource distribution, the module can provide an opportunity for integrating new or previously unscheduled data streams into an existing network without impairing existing data streams.

Figure 4:
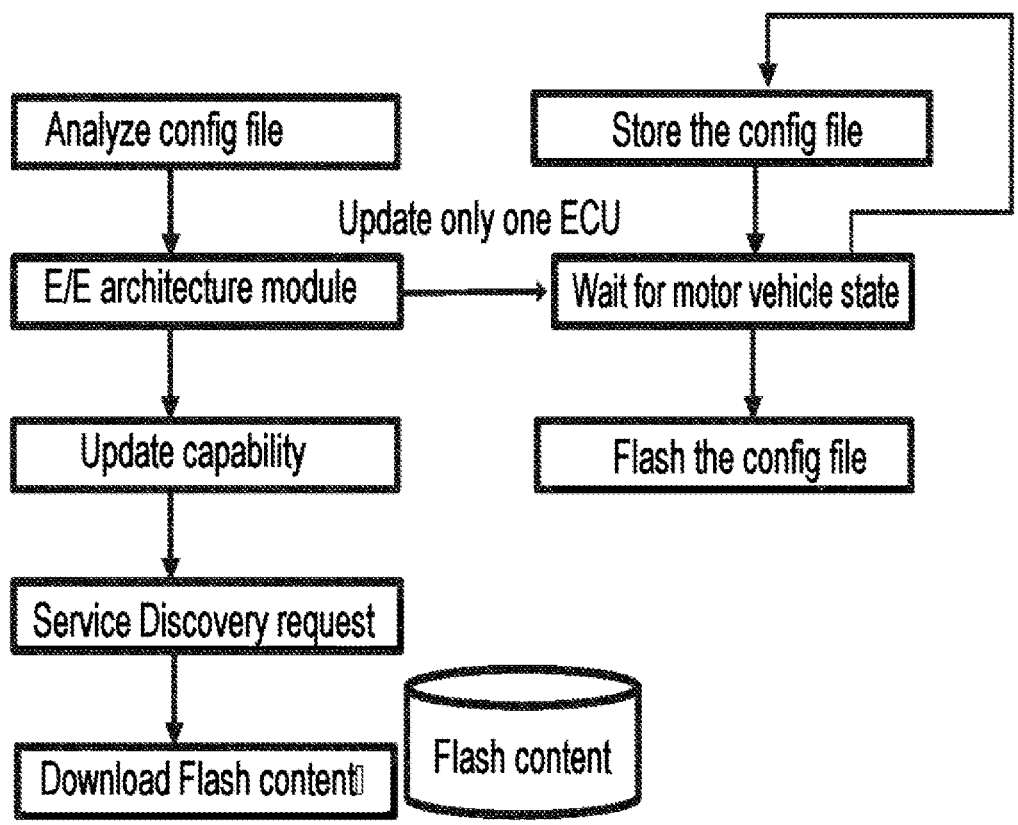
FIG. 4 shows a schematic depiction of a method according to an exemplary embodiment of the present invention.

FIG. 4 shows a schematic depiction of a method according to a further exemplary embodiment of the present invention.

FIG. 4 shows a method for ascertaining the flash clients for the Ethernet-relevant control units in the vehicle.

Depending on the configuration, a distinction can be drawn between the update of individual control units/functions and updates for multiple related control units/networks/functions, and the flash process can accordingly also be designed therefor. The flashing itself is not the problem, but rather the subsequent activation of the (new) function and thus a possibly changed communication behavior.

For technological reasons, the flash process cannot actually be carried out simultaneously. The new and/or changed configurations can in principle be distributed to the control units/switches in the network in random succession, but the activation, that is to say actually using or arming the new configuration, must take place on all subscribers at the same time so that at least some of the changed/new communication streams do not encounter old rule systems somewhere along the way and are then interrupted, for example.

For this simultaneous activation of the new configuration, it is necessary to ensure, for example, that all affected control units/switches have a synchronized time base so that each control unit actually presents the same point in time.

If for example the network behavior is to be fundamentally changed, then it is important for the changed configurations to be activated at the same time, for example, as otherwise the network blocks newer, staggered processes.

The relevant flash clients of the respective switches can be ascertained in this case. In addition, a check is performed to determine whether there is vehicle-wide time synchronization.

These can either be connected to the switches directly or locally via or can also be located remotely in the network and flash the switch via the network.

According to one exemplary embodiment of the present invention, an update process that provides the configuration files with a time stamp (execution time) and notifies the flash client with the target address of said configuration files can then be executed, or distributed in advance and executed simultaneously on the ECUs/switches that are to be updated only at the specified time.

This allows a synchronized update process to be achieved in the distributed network and computer system of the vehicle.

Although the present invention has been described above on the basis of preferred exemplary embodiments, it is not limited thereto but rather can be modified in a variety of ways. In particular, the invention can be changed or modified in a variety of ways, without departing from the core of the invention.

In addition it will be noted that "comprising" and "having" does not exclude any other elements or steps and "a" or "an" does not exclude a plurality.

Furthermore, it will be noted that features or steps that have been described with reference to one of the above exemplary embodiments can also be used in combination with other features or steps of other exemplary embodiments described above. Reference signs in the claims should not be considered to be limiting.

The wireless transmission or the wireless reception of the update data takes place by Bluetooth, WLAN (e.g. WLAN 802.11a/b/g/n or WLAN 802.11p), ZigBee or WiMax or else cellular radio systems such as GPRS, UMTS or LTE. It is also possible to use other transmission protocols. The cited protocols provide the advantage of the standardization that has already taken place.

The vehicle is for example a motor vehicle, such as a car, a bus or a truck, or else a rail vehicle, a ship, an aircraft, such as a helicopter or an airplane, or for example a bicycle.

The invention claimed is:

1. An apparatus for configuring and validating an intervention in a real-time Ethernet data network having ECUs in a motor vehicle, the apparatus comprising:
a vehicle diagnostic device, which is configured to receive configuration change data and to transfer said configuration change data to a first data storage device;
the first data storage device, which is configured to receive and store the configuration change data from the vehicle diagnostic device;
a first data checking device, which is configured to check the configuration change data stored in the first data storage device by using a first integrity check and to transfer said configuration change data to a second data storage device in the event of a positive first integrity check;
the second data storage device, which is configured to receive and store the configuration change data from the first data checking device;
a second data checking device, which is configured to check the configuration change data stored in the second data storage device by using a second integrity check and to enable said configuration change data for the real-time Ethernet data network in the event of a positive second integrity check taking into consideration the overall affected network state, wherein the second integrity check involves checking whether and which effects the configuration on the network, this comprising a check on the ECUs for the configured configuration and a check on the associated communication relationship; and
a configuration master device, which is configured to receive the enabled configuration change data from the second data storage device and to transmit said configuration change data to a switch and/or a component of the real-time Ethernet data network in order to renew at least some of an Ethernet TSN configuration in the ECUs and switches.

2. The apparatus as claimed in patent claim 1, wherein the first data checking device is configured to check the configuration change data to be stored in the first data storage device for a communication parameter, for example in the form of a maximum packet size and/or a transfer frequency and/or a transfer rate and/or a sender address and/or a receiving address and/or a protocol, on receipt by using the first integrity check.

3. The apparatus as claimed in claim 2, wherein the apparatus further comprises an ARQ/TCP device, which is configured to monitor the transfer of the configuration change data to the switch and/or the component of the real-time Ethernet data network and the configuration process based thereon.

4. The apparatus as claimed in claim 3, wherein the apparatus is configured to monitor an individual configuration process for a switch and/or a component of the real-time Ethernet data network.

5. The apparatus as claimed in claim 4, wherein the apparatus is configured to monitor a multiplicity of configuration processes for a multiplicity of network switches and/or for a multiplicity of components of the real-time Ethernet data network.

6. The apparatus as claimed in patent claim 5, wherein the apparatus is configured to prioritize the multiplicity of configuration processes for the multiplicity of network switches and/or for the multiplicity of components of the real-time Ethernet data network in terms of timing and/or to perform at least some of said multiplicity of configuration processes simultaneously.

7. The apparatus as claimed in patent claim 5, wherein the apparatus is configured to activate at least some of the multiplicity of configuration processes for the multiplicity of network switches and/or for the multiplicity of components of the real-time Ethernet data network simultaneously on the network switches and/or the components.

\* \* \* \* \*